Figure 14:
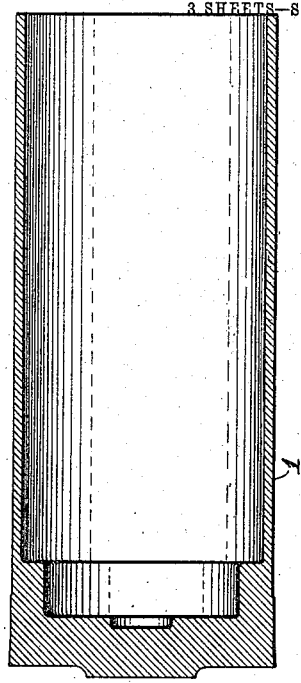
Figure 12:
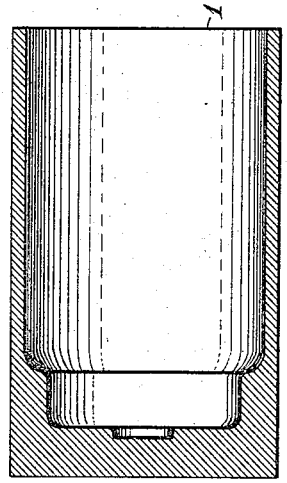
Figure 11:
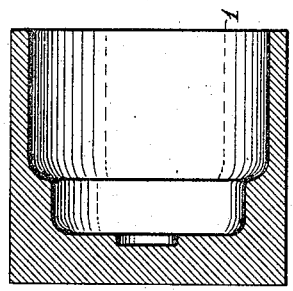
Figure 13:
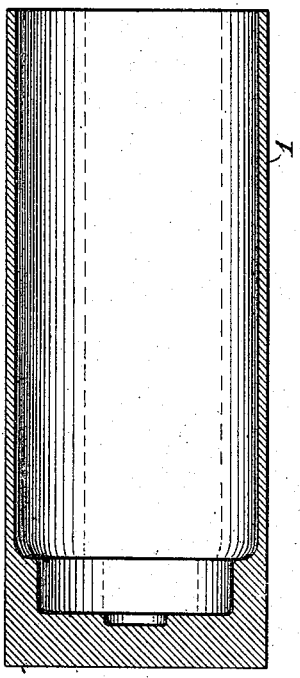

No. 723,256. PATENTED MAR. 24, 1903.
A. H. EMERY.
SHRAPNEL SHELL.
APPLICATION FILED JULY 12, 1901.
NO MODEL. 3 SHEETS—SHEET 1.
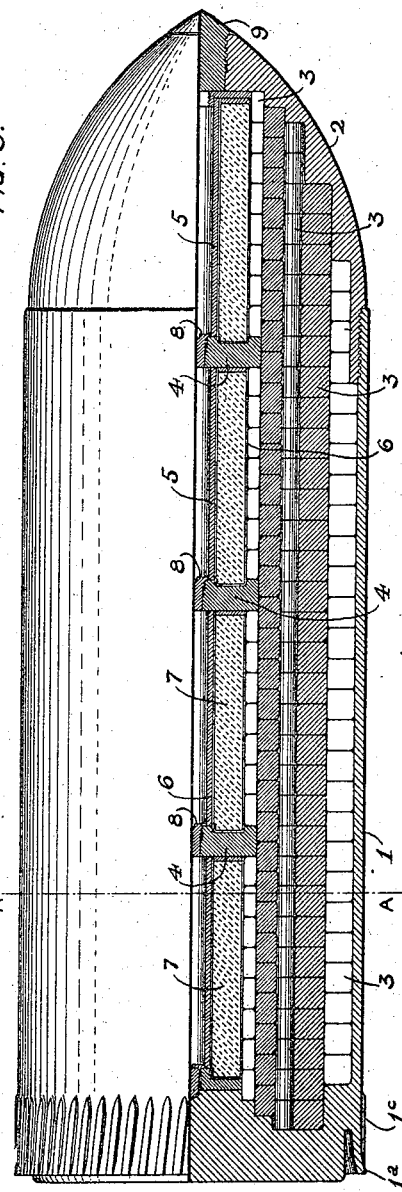
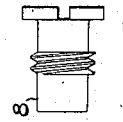
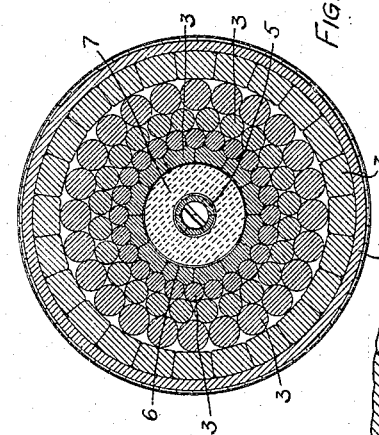
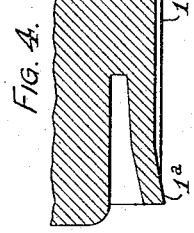
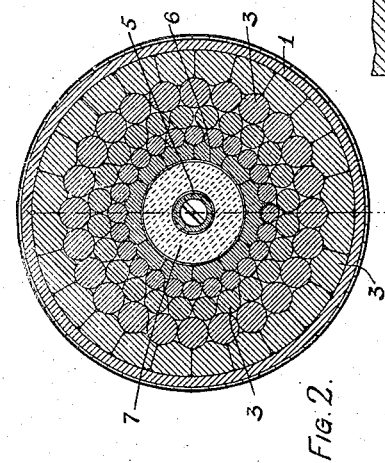
WITNESSES:
INVENTOR.
Albert H. Emery
By Knight Bros
ATTORNEYS

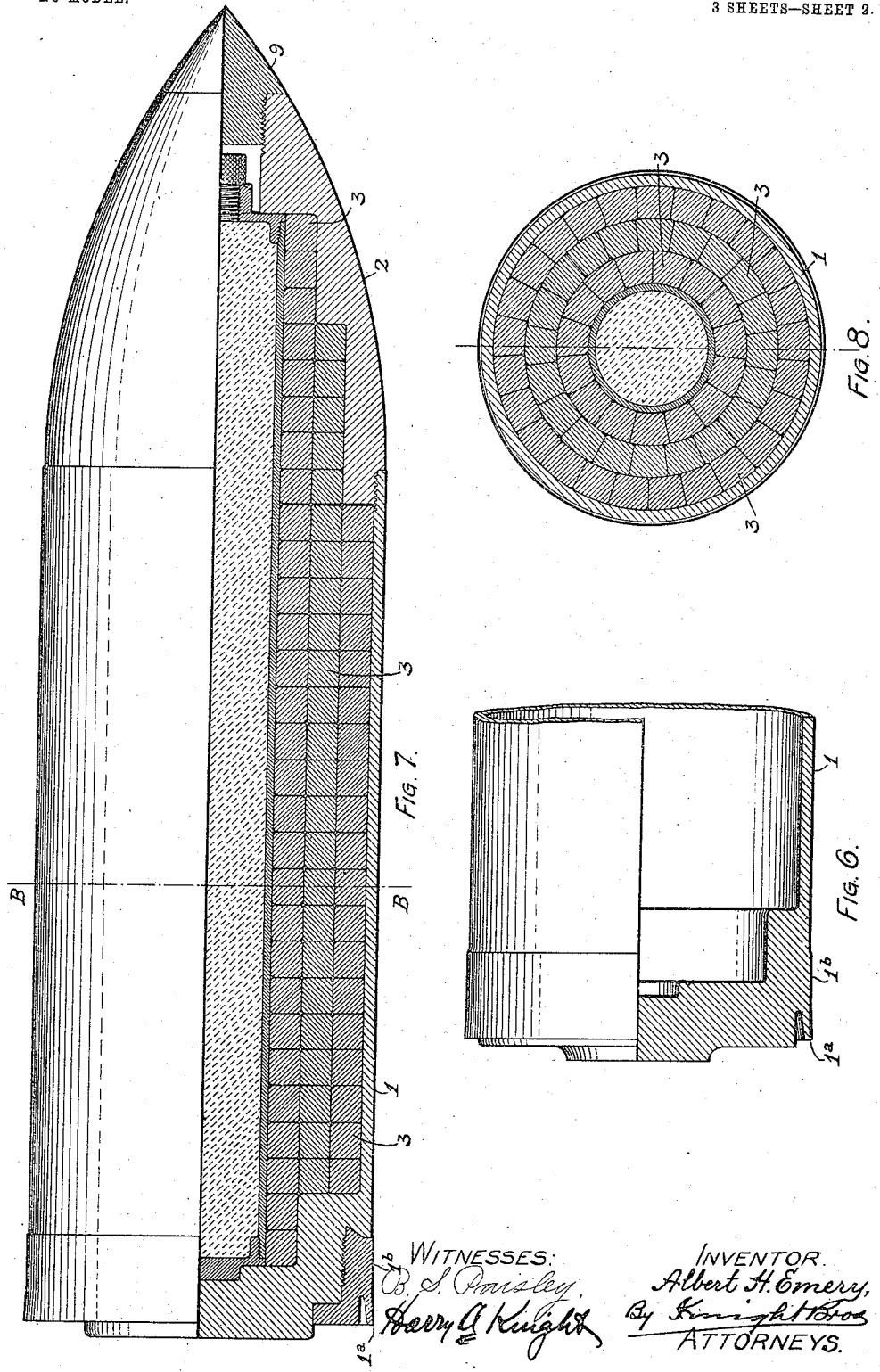

No. 723,256. PATENTED MAR. 24, 1903.
A. H. EMERY.
SHRAPNEL SHELL.
APPLICATION FILED JULY 12, 1901.
NO MODEL. 3 SHEETS—SHEET 3.

WITNESSES:
B. S. Paisley.
Harry A. Knight

INVENTOR
Albert H. Emery,
By Knight Bros
ATTORNEYS.

UNITED STATES PATENT OFFICE.

ALBERT H. EMERY, OF STAMFORD, CONNECTICUT.

SHRAPNEL-SHELL.

SPECIFICATION forming part of Letters Patent No. 723,256, dated March 24, 1903.

Application filed July 12, 1901. Serial No. 68,003. (No model.)

*To all whom it may concern:*

Be it known that I, ALBERT H. EMERY, a citizen of the United States, and a resident of Stamford, in the county of Fairfield, in the State of Connecticut, have invented certain new and useful Improvements in Shrapnel-Shells, of which the following is a specification.

This invention is illustrated in the drawings by fourteen figures, in which—

Figure 1 is a side elevation of the preferred form of this shell, partly in section. Fig. 2 is a transverse section of the shell shown in Fig. 1 on the line A A. Fig. 3 is a section of the same with a modification in the form of the outer row of projectiles. Fig. 4 is a full-sized view of the gas-check and rifling-ring. Fig. 5 is a full-sized view of a plug closing one of the interior chambers. Fig. 6 shows a portion of an empty case or body of a shell in side elevation, partly in section. Fig. 7 shows a side elevation of one form of this shell, partly in section, where the packing-ring is made separately from the shell and screwed thereon. Fig. 8 shows a transverse section of this shell on a line B B, Fig. 7. Figs. 9 to 14, inclusive, show a body or case of a shell in different stages of the process of stamping and drawing from the blank to the nearly-finished shell.

In all the drawings, 1 represents the case. This case is made with thin walls and a thick base. The walls are made thin so as to weigh but little and permit the interior of the case to hold many projectiles. They are also made thin to insure breaking into small pieces when the shell explodes. To make them as thin as is desired, they must be of ductile metal, soft steel, brass, or bronze being the most suitable. Steel, though subject to rust, is more economical than bronze. The base of the projectile must be thick enough to avoid breaking in the gun when firing.

Fig. 1 shows a projectile which is intended for large guns and may be used with very heavy pressures and is suitable for penetrating targets of very material resistance, as will also the shell shown in Fig. 7, though that in Fig. 1 has a stronger base and is intended for higher firing pressures. When the shrapnel is to be used for penetration, it is especially desirable that this base should be strong and so constructed and arranged with reference to the rest of the shell that it may aid in the penetration of the target. For this purpose and for all purposes for better projecting the projectiles which are contained in the case the base is constructed with offsets, which enable it to properly support the projectiles contained in the shell both in firing and during the shock of penetration. These offsets are so arranged as to support the projectiles and at the same time have the metal constituting the base so disposed that when the shell explodes a very material portion of the base will break into several pieces, and thus do duty as shrapnel.

Figure 10:
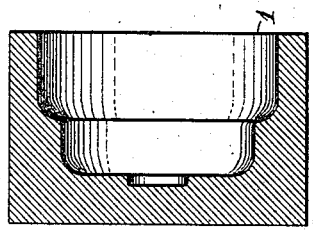
Figure 9:
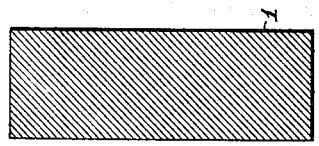

In Figs. 9 to 14 the case 1 is shown in different stages of the stamping or drawing, where I begin from a cylindrical blank, (shown in Fig. 9,) which is drawn by forcing it in and through dies first into the form shown in Fig. 10, then 11, afterward 12 and 13, by continued drawing until the walls have reached the desired thickness and length, when the whole is placed in a die and the base is brought up to the required diameter to form the lip and rifling-ring, when the metal is suitable for this and it is to be integral with the case. If the metal is sufficiently ductile, the groove which is made to form the lip $1^a$ may be pressed in, or it may be turned in in a lathe. If this case is made of a steel, bronze, or brass casting, it may be made from a blank of the form shown in Figs. 9, 10, or 11 and pass through successive drawings until it reaches the desired form; but I prefer in all cases, whether made of brass, bronze, or soft steel, to start with forged instead of cast metal and prefer to start for the drawing with a cylindrical blank about the form and proportions shown in Fig. 9, this blank being previously cut from a forged bar. It may well be cut from a bar not much larger than the diameter of the finished projectile, but best from a bar of smaller diameter, and then be upset to nearly the proportions shown in Fig. 9, as this gives more working and toughens the metal.

In all the drawings, $1^a$ shows a thin lip around the rear of the base, with a diameter somewhat larger than the bore of the gun at the bottom of the grooves, thus forming a gas-check, which entirely cuts off the flow of gas past the shell in uneroded guns.

1ᵇ shows a portion of the shell in Figs. 6 and 7 of a diameter nearly or quite as large as the bore of the gun measured at the bottom of the grooves. As the projectile is forced forward the lands press into this part of the projectile and cause it to rotate with the rate due to the twist of the grooves. The section of the projectile at this point should be such that the part which constitutes the rifling-ring will fill the grooves full at the time the bore has its maximum expansion under the extreme pressure produced by firing. This not only causes the projectile to turn with the rifling-grooves, but filling the bore completely full prevents the passage of gas in uneroded guns, thus nearly preventing erosion.

Without the lip 1ᵃ the momentary enlargement of the chamber of the gun and the consequent enlargement of the bore at the shot-seat around the rifling-ring permit the gases to flow rapidly under very high pressure and heat past the rifling-ring before the projectile moves much, quickly eroding the bore of the gun, and such erosion will rapidly increase at each subsequent firing. The use of the tight-fitting, thin, easily-expanding lip 1ᵃ prevents this passage of the gases in uneroded guns, and so in a great measure protects them against erosion.

The case of the shell may be of metal so soft that it may be worked in the dies either hot or cold and yet so hard that it is too great a strain on the gun and lands to force it through the bore of the gun when made as above described, because the pressure on the lands to force their way into that part of the shell which forms the packing and rifling ring would be too great for the lands to endure well. In such a case it would be well to use the rifling and packing ring in a separate piece, as shown in Fig. 7, where the ring 1ᵃ 1ᵇ is made of a suitable metal, such as bronze or copper, securely fastened to the shell. I may avoid the use of this separate piece by forming lands 1ᶜ on the rifling-ring, as shown in Figs. 1, 2, 3, and 4, where the base of the projectile is made to fit the expanded bore tightly at time of firing, being too large to move from the powder-chamber into the bore until the bore is momentarily enlarged at time of firing, when, although the projectile fits tightly, the heavy pressure behind it forces it forward in the expanded and tightly-fitting bore. These lands may well be used, even if the metal is soft enough to work well without their formation previous to firing, and they may well be used if a soft-metal packing-ring 1ᵃ 1ᵇ (shown in Fig. 7) is used. Though not there shown, they might well be provided, as the projectile will move more easily and with less wear on the lands than there would be if the ring is left solid without the lands, as shown in Fig. 7. When these lands are used, they should be pointed at their front ends, as shown in Fig. 1, as should also the rear ends of the lands in the gun from which they are to be fired, and the bore of the gun at the shot-seat should be of such diameter that the projectile may be forced forward until the forward portion of its rifling-lands have entered the grooves in the gun, while at the same time the bore of the gun is of such diameter as to cause the enlarged lip of the projectile to prevent further forward movement of the projectile until firing takes place. When thus formed, the projectile can be carefully slipped to its seat in the gun.

The ordinary shrapnel-shell is very poorly adapted for penetration. When this projectile is to be used for a field-shell, the matter of penetration is not of vital importance; but when it is used from guns on shipboard or from coast-defense guns against ships it is often very desirable that it have great powers of penetration. This is especially the case whenever it is not used with a time-fuse, but is desired to explode after it has passed into the ship or fortification. For this reason I make the front 2 best of tempered steel, tough and hard, with offsets normal to the axis of the shrapnel-shell and closely fitting the front end of the longitudinal piles of projectiles contained therein.

Spherical balls or spherical balls flattened on two opposite faces are not at all suitable for a projectile which is to have much penetrating power. Spherical balls in filling up the shell, except the powder-chamber, occupy more space than they should for the weight they have, owing to the large cavities between them. For this reason and because of their unfitness for use in a shell where penetration is desired I would not use them at all, but in their place use short flat-ended prismatic or cylindrical projectiles 3, with preferably slightly-rounded corners. They should in all cases be arranged to form annular layers, in which the projectiles of any annular layer are of uniform length. The offsets in the base may well be made of such thickness and the length of these small projectiles 3 such that those of one annular column break joints with those of the adjacent column, as shown in Fig. 1, which is not done in the projectile shown in Fig. 7, though it could well have been done, as when so piled the tendency is to better break up the outer portion of the base when the projectile explodes. If the projectiles 3 are cast in the ordinary way, not round, but of the forms shown in Figs. 3 and 7, they will not be readily made of sufficiently accurate dimensions to pile, as there shown. They may, however, be made to pile very well if sufficient care is used in casting them to make them very nearly the same weight and of section a little smaller than they are to have in the finished form and then before piling stamping or pressing them in a die until they have all been brought to the required length, width, and thickness, so as to pile with entire uniformity as desired; but this will require that the inequalities of weights are such that the extra weight of any projectile used will not quite fill up the corners when pressed in the die and that those of the lightest weight used will not when pressed to the required length in the die leave greater spaces for the rounding at the corners than is desired or permissible. Steel is the most suitable material for these projectiles both on account of cost and ability to stand up and do the work in use. When made of steel, I prefer to make them of rolled or drawn bars, which had best be made of a section very nearly the desired form, with diameters slightly smaller than are desired in the finished projectile. When the bar has been rolled or drawn to the required size, it should be sheared into such lengths as will give the required weight and then be pressed in dies to have the required length and form desired, with the proper diameters for piling. The variation in weights made in shearing should not be so great as to prevent some rounding of the corners when pressed to the proper length, nor so light as to leave the rounding at the corners greater than is desired or permissible. This is easily accomplished with the rolled or drawn bars, which are much cleaner and better to use in the dies than are the cast projectiles and at the same time are very much less expensive. Besides when these projectiles are made from rolled or drawn bars the projectiles are not only made more uniform and better, but the machinery is readily made automatic, so that very long bars are fed to the machine and made into finished projectiles without further handling. These projectiles may well be made and used in the form shown in Figs. 7 and 8, where they are of nearly uniform weight, or they may be used of the forms shown in Figs. 1, 2, and 3. In this case they are piled as shown. When so made, if they are made of uniform lengths, which is very desirable, the weights of those in the outer annular column are heavier than those interior thereto. The outer row of those in Fig. 2 are better shaped than those shown in Fig. 3, as they fill the shell more closely and cause the case when the projectile explodes to break up more uniformly than if they are formed and piled as shown in Figs. 3 or 8. In this respect the cylindrical form for the second row, (shown in Fig. 2,) acting in conjunction with the form shown in the outer row in Fig. 2, tends to split the case into as many longitudinal pieces as there are projectiles in the outer row. There is not so much regularity in this respect in those of the form shown in Fig. 3, and still less when they are of the form shown in Fig. 8. The form of the inner row of projectiles shown in each of Figs. 2, 3, and 8 supports very well the powder-case for the interior bursting charge. In Figs. 2 and 3 the size, form, and piling of the projectiles is so symmetrical in many respects that when the projectile bursts not only does the case break up with great regularity, but the projectiles themselves separate with almost absolute uniformity in all corresponding directions from the axis. In Figs. 2 and 3 the inner ring of the projectiles consists of half the number of the next adjoining ring, and the bars are rolled not only to fit each other on the adjacent sides and the annular case of the explosive, but the exterior is rolled to fit two of the adjoining outer projectiles. Making these projectiles thus and piling as here shown has the effect to prevent the early separation of the projectiles, they by their inertia forming a heavy resisting case or wall around the explosive, against which the explosive piles up a very heavy gas-pressure before separation takes place. The result is that a much more violent explosion occurs with the same weight of explosive, and the projectiles are separated with much more force than if they are loosely assembled in the ordinary poorly-fitting ways. In Fig. 2 all the projectiles are shown piled absolutely symmetrical with those around them, and they remain so until the projectile is burst, which insures the uniform distribution desired. In Fig. 3 they are also all so piled, and they will all remain so, except the outer row, which may or may not retain the symmetrical position with reference to the others, as the outer row could be moved a little, so that the position of those projectiles of the outer row would not be symmetrical with those next adjoining, as now shown. The form, therefore, in Fig. 2 is much preferable for this reason and for the additional reason of filling more fully the case of the shell.

When this shell is used for penetration and fired from a large gun into a ship or fort, it is very desirable that after penetration it should explode with great force, driving its many contained projectiles and the many fragments into which the exterior is then broken with high velocity in all directions. For this purpose I prefer to use in the interior chamber a high explosive, which, if as sensitive as explosive gelatin, should be divided into such lengths by transverse supporting-diaphragms that it will not explode by the shock of firing. Fig. 1 shows a shell so charged with high explosive where the interior space for the explosive is shown divided into four compartments by three diaphragms 4. These diaphragms are supported by the inner row of projectiles and by an inner tube 5. This tube may be made of four short pieces of such lengths as to help support the diaphragms. Each tube may be in a single tube, as shown in Fig. 1, though I prefer them built of staves, as shown in Figs. 2 and 3. The inner row of projectiles, these tubes 5, and the three diaphragms 4, as shown in Figs. 1, 2, and 3, divide the annular powder-chamber into four annular chambers, each of which is shown charged with a tightly-fitting case 6, filled with high explosive 7. The case 6 when so used should be of suitable material, best thin sheet metal, in which the explosive is placed and sealed, as explained in my application of July 12, 1901, Serial No. 68,004. The central tubes are closed and separated from each other by a small screw-plug 8, (shown in Fig. 5,) which has at its upper end a thin flange. The strength of this flange is not great, and sufficient threads are left on the plug to avoid shearing when firing takes place. Each of the tubes 5 may contain an igniting charge. That in the upper one may be fired by a time-fuse or a percussion-fuse or may be so made as to be ignited when the projectile penetrates a target. The plugs 8 separate these charges until the front charge is ignited, when the plug from that chamber is blown through into the next and the charge therein ignited, each charge in turn lighting the one behind it. At the same time that it lights the one behind it it should have a sufficient violence to burst the tube or separate the staves and detonate the high explosive 7 in the chamber around it.

The front of the projectile is here shown closed with a cap 9. When the shell is not to explode from impact with the target or from a delayed fuse in the front interior tube, the plug 9 is removed and a time-fuse screwed therein, arranged to explode at the proper time. No fuse is here shown, nor are any firing or detonating charges shown in the inner tubes.

Having thus described my invention, what I claim as new therein, and desire to secure by Letters Patent, is—

1. In a shrapnel-case a cylindrical body and base formed from a single piece of forged ductile metal by stamping and drawing it into a thick-based and thin-walled hollow cylinder of the desired form in one piece; said base having a thin integral lip extending from its rear for rifling the shell and preventing the gases from passing it at the time of firing, said lip having a diameter greater than the diameter at the bottom of the grooves on the bore of the gun from which it is to be fired.

2. In a shrapnel-case a cylindrical body and base formed from a single piece of forged ductile metal by stamping and drawing it into a thick-based and thin-walled hollow cylinder of the desired form in one piece; said base having a thin integral lip extending from its rear, with projections on its exterior to fit the grooves of the gun.

3. A shrapnel having a base formed with a series of concentric offsets each having a continuous, plane face constructed to receive and support annular columns of projectiles seated thereon.

4. In a shrapnel constructed to receive a series of annular columns of projectiles with a central explosive charge; a base formed with a series of offsets upon which the columns respectively seat and increasing in thickness toward the center.

5. A shrapnel-shell having a series of closely-fitting annular columns made up of small projectiles piled together, these projectiles being constructed from rolled or drawn bars of uniform section sheared into substantially uniform lengths and pressed in a die to bring them to exact dimensions of length and diameter to permit of exact symmetrical piling.

6. In a shrapnel, the combination of the shell, an annular group of projectiles symmetrically arranged within the shell and leaving an inner chamber, and transverse partitions dividing said inner chamber, into a longitudinal series of chambers, and inner annular columns of projectiles located between the transverse partitions to support them.

7. In a shrapnel, the combination of a shell, the annular group of projectiles arranged around the inner wall of the shell and leaving a central space within them; the series of transverse partitions dividing the central space into a longitudinal series of spaces, central tubes in the longitudinal series of spaces, dividing each into a central and a surrounding annular chamber; and aiding to support the transverse partitions.

8. In an explosive shrapnel, the combination of the shell, a group of symmetrically-arranged projectiles leaving a central space within them, the central tube, the transverse partitions dividing the space between said tube and group of projectiles into a series of annular chambers, and formed with annular seats, and the annular envelops fitting said seats and filling the spaces between the partitions.

The foregoing specification signed this 3d day of July, 1901.

ALBERT H. EMERY.

In presence of—
NATHL. R. HART,
JOHN E. KEELER.